3,215,758
CONDENSATION POLYMERS
Thomas R. Hopkins, Shawnee Mission, Kans., assignor to Gulf Oil Corporation, Pittsburgh, Pa., a corporation of Pennsylvania
No Drawing. Original application May 10, 1961, Ser. No. 109,018. Divided and this application Nov. 12, 1964, Ser. No. 410,781
4 Claims. (Cl. 260—868)

This application is a division of U.S. application Serial No. 109,018, filed May 10, 1961.

This invention relates to high molecular weight isocyanurate compositions. More particularly, it relates to resinous condensation products of isocyanurate compounds having N-(beta-hydroxyethyl) substituents represented by the following formula:

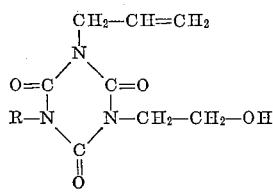

wherein R is an allyl or a beta-hydroxyethyl radical. The compounds encompassed by the above formula are mono-allyl-di(beta-hydroxyethyl) isocyanurate and diallylmono-(beta-hydroxyethyl) isocyanurate. These compounds may be made by the processes described in co-pending U.S. application Serial Number 109,017, by Donald L. Burdick, William C. Francis, and Joseph W. Jones, Jr., filed May 10, 1961.

Polyesters can readily be formed from monoallyl-di-(beta-hydroxyethyl) isocyanurate and a dicarboxylic acid having from two to about twenty carbon atoms. In the preparation, suitable elevated reaction temperatures will be used as hereinafter exemplified in the examples. Customary catalysts used by the skill of the art in polyester formation are desirably utilized.

Suitable dicarboxylic acids for the ester formations include both aryl and aliphatic dicarboxylic acids illustrative of which are succinic, adipic, o-phthalic, terphthalic, sebacic, 1,4-naphthalene-dicarboxylic, azelaic, glutaric, 3-ethylsebacic, and the like carboxylic acids. When appropriate, corresponding acid halides or anhydrides can be employed as the dicarboxylic acid agent. Relative proportions of the isocyanurates and dicarboxylic acids will be selected to insure polyester formation. Portions of the beta-hydroxyethyl substituted isocyanurate employed, usually not in excess of about fifty percent thereof, can be and often desirably are replaced in the ester formation reaction mixtures with equimolar quantities of diols commonly employed in polyester formation. Diols such as the following having two to twelve carbon atoms are suitable for such substitution in the reaction mixtures: ethylene glycol, propylene glycol, hexamethylene glycol, neopentyl glycol, diethylene glycol, decamethylene glycol, 2,2-dimethyl-1,3-propanediol, and the like.

An important virtue of the polyesters having groups corresponding to monoallyldi(beta-hydroxyethyl) isocyanurate is that they can be readily cured. Polyesters containing allyl group can be cured to form thermoset polymers conventionally by heating an admixture of the polymer and a catalytic amount of a free radical initiator such as a suitable peroxide, e.g., t-butyl perbenzoate. If desired, a quantity of a monomer can be added in preparation of the thermoset polymers to promote the linking of the double bonds of the allyl substituents. Such monomers having unsaturations as styrene, triallyl isocyanurate, and the like can be employed for this purpose.

Diallylmono(beta-hydroxyethyl) isocyanurate provided by this invention is a useful compound in providing terminating polyester groups as in the above polyesters, especially where curable groups are desired. Since it has only one hydroxyl group, it does not permit formation of long polyester chains when it is the sole hydroxy-contributing monomer. However, by varying its concentration in a polyester-forming reaction mixture, convenient regulation of average polymer chain length is afforded. Of course, when under polyester forming conditions, if it is the only hydroxy-contributing monomer present, its mono- or diester results by the reaction with the dicarboxylic acid, which in turn also can be cured in a manner as described above in view of the presence of allyl groups.

The following examples are in further illustration of this invention but are not in limitation thereof. It will be obvious to those skilled in the art that variations can be made without departing from the spirit and scope of this invention. Such obvious departures are meant to be within the scope of this invention as are consonant with the claims appended hereto.

EXAMPLE 1

Preparation of monoallyldi(beta-hydroxyethyl) isocyanurate

A mixture of 97.5 g. (0.5 mole) of trisodium cyanurate and 3.0 g. of sodium hydroxide in 500 ml. of dimethylformamide is heated with stirring to 143° C. A second mixture of 80.5 g. (1 mole) of ethylene chlorohydrin and 38.3 g. (0.5 mole) of allyl chloride is added in dropwise manner to the above trisodium cyanurate mixture with stirring over a period of three hours. Upon completion of the addition of the ethylene chlorohydrin-allyl chloride mixture, the reaction mixture is maintained at a temperature in the range of 130° to 148° C. for an additional two hours. The reaction mixture is then cooled, 0.5 g. of hydroquinone is added, and a precipitate of cyanurate salt which appears is removed by filtration. The cyanurate salt precipitate is treated with dilute hydrochloric acid to yield 0.026 mole of unreacted cyanuric acid. The dimethylformamide is removed from the filtrate providing a dry residue of monoallyldi(beta-hydroxyethyl) isocyanurate. The dry residue of the desired product consists of a viscous liquid. Calculated for $C_{10}H_{15}N_3O_5$: C, 46.8; H, 5.8; N, 16.3. Found: C, 45.88; H, 5.78; N, 15.83. Infrared absorption analysis of the product shows the presence of both allyl and hydroxyl groups.

The product is further purified by dissolving in an equal amount by weight of acetone. The acetone mixture is permitted to stand overnight in refrigerator and filtered to remove a precipitate which forms. The acetone filtrate is evaporated to dryness in vacuo to provide a residue of purified monoallyldi(beta-hydroxyethyl) isocyanurate.

EXAMPLE 2

Preparation of diallylmono(beta-hydroxyethyl) isocyanurate

A mixture of 97.5 g. (0.5 mole) of trisodium cyanurate and 3.0 g. of sodium hydroxide in 500 ml. of dimethylformamide is heated to 146° C. A second mixture of 40.3 g. (0.5 mole) of ethylene chlorohydrin and 76.5 g. (1.0 mole) of allyl chloride is added to the above trisodium cyanurate mixture dropwise with stirring over a period of two hours. After the addition, the stirring is continued for an additional one hour while maintaining the reaction mixture at about 142° C. The mixture is then cooled and 0.5 g. of hydroquinone is added. The cooled reaction mixture is processed providing the desired end product of diallylmono(beta-hydroxyethyl) isocyanurate in the manner described above in Example 1. About 7.6 percent of the unreacted cyanuric acid is recovered. The product of diallylmono(beta-hydroxyethyl) isocyanurate consisting of a viscous liquid is obtained in a yield of 132.3 grams.

Calculated for $C_{11}H_{15}N_3O_4$: C, 52.1; H, 5.9; N, 16.6. Found: C, 50.91; H, 6.41; N, 16.31.

EXAMPLE 3

*Preparation of monoallyldi(beta-hydroxyethyl) isocyanurate-adipate ester*

Monoallyldi(beta - hydroxyethyl) isocyanurate (1.5 mole) and adipic acid (1 mole) is heated in an argon atmosphere for twenty-nine hours at an initial temperature of about 140° C. The reaction temperature is gradually increased to a final temperature of about 190° C. The reaction mixture is then cooled and is thoroughly washed successively with xylene and ethanol. The washed monoallyldi(beta-hydroxyethyl) isocyanurate-adipate polyester is a rubbery solid essentially insoluble in ethanol, diethyl ether, benzene, acetone, carbon tetrachloride, and ethyl acetate. The polyester shows on infrared analysis presence of allyl and ester groups; it has a softening point of about 100° to 120° C. The polymer product gives a positive iodine test for unsaturation.

A uniform mixture of 80 parts of the above polyester, 20 parts of styrene, and 2 parts of t-butyl perbenzoate is cured employing a temperature of 200° C. and a pressure of 2000 p.s.i.g. A cured (or thermoset) polymer having a Barcol hardness value of about 70 or greater can be thus obtained. The cured polymer decomposed on heating without melting, confirming that a cured polymer is obtained.

What is claimed is:

1. A polyester of monoallyldi(beta-hydroxyethyl) isocyanurate and a dicarboxylic acid having from two to about twenty carbon atoms.

2. A polyester of monoallyldi(beta-hydroxyethyl) isocyanurate and a dicarboxylic acid having four to about ten carbon atoms.

3. A polyester of monoallyldi(beta-hydroxyethyl) isocyanurate and adipic acid.

4. A thermoset solid resinous product of reaction of styrene with a polyester of monoallyldi(beta-hydroxyethyl) isocyanurate and adipic acid.

No references cited.

MURRAY TILLMAN, *Primary Examiner.*